United States Patent Office 3,541,005
Patented Nov. 17, 1970

3,541,005
CONTINUOUS ULTRAFILTRATION OF
MACROMOLECULAR SOLUTIONS
Heinrich Strathmann, Aachen, Germany, and Richard W. Baker, Brooklyn, N.Y., assignors to Amicon Corporation, Lexington, Mass., a corporation of Massachusetts
No Drawing. Filed Feb. 5, 1969, Ser. No. 796,928
Int. Cl. B01d *13/00*
U.S. Cl. 210—19                                   7 Claims

ABSTRACT OF THE DISCLOSURE

A process for effecting the separation of macromolecular, gel-forming substances from solutions thereof comprising forcing said solutions across the face of a membrane separation device under conditions of relatively high velocity, yet laminar flow, thereby achieving an improved rate of liquid throughput with a surprisingly effective separation efficiency.

BACKGROUND OF THE INVENTION

Membrane-separation technology and its application to desalination-type reverse-osmosis applications have been discussed by Brian in Industrial and Engineering Fundamentals, 4, 439 (1965), and Sherwood, Brian, Fischer and Dresner in Industrial and Engineering Fundamentals, 4, 113 (1965).

Therein, and elsewhere in the art, it is explained that, at equilibrium in a membrane-moderated separation of solute from solution, the amount of solute being carried to the membrane surface is (1) $$J_w \cdot C = J_s$$

wherein $J_w$ is solvent flux going through the membrane and C is the concentration of the salt solution at a given distance from the membrane. Actually C varies between $C_w$ and $C_B$ wherein $C_w$ is the concentration of solute at the membrane surface and $C_B$ is the concentration of solute at that finite distance from the membrane surface wherein the amount of solute is determined by the concentration of the feed solution and largely unaffected by buildup of solute at the membrane wall. If the distance from the membrane surface (where we have solute concentration $C_w$) to the area where we reach concentration $C_B$ is taken as X; and, if further, we take the mobility of the solute as being represented by a diffusion coefficient $D_s$ then the concentration gradient of the solute will be a good measure of the rate $J_s$ at which solute back-diffuses from the membrane surface:

(2) $$J_s = -D_s \frac{dc}{dx}$$

wherein $dc/dx$ is the concentration gradient, wherein $D_s$ is the diffusion coefficient, and $J_s$ is the rate at which solute diffuses back away from the membrane surface. Since at steady state and at any point X away from the surface, the rate of solute going to and coming from the membrane will be equal, it follows from Equations 1 and 2 that (3) $$J_w \cdot C = -D_s \frac{dc}{dx}$$ or differentiating, (4) $$\frac{C_w}{C_B} = \text{exponential} \frac{J_w}{D_s} X$$

Because the $D_s$ is inversely proportional to the molecular weight, the concentration polarization $C_w/C_B$ (the magnitude of which is an excellent measure of how badly the solute is accumulating adjcent the membrane surface) becomes much larger as the molecular weight of the solute increases. The concentration polarization also tends to become large as the total flux increases, tending therefore to limit any increase in flux.

It is clear that two factors which cause high polarization concentration and thereby mitigate against the successful application of high flux, membrane-moderated, processes are the high molecular weight of the solute and the high liquid transport rates (i.e., flux) across the membrane surface.

One way of decreasing the concentration polarization has been to reduce the value of X by utilizing a so-called thin-channel process wherein the solutions being concentrated or subject to ultrafiltration is caused to flow, under laminar conditions, across the face of the membrane but through a thin channel. Typically such channels are from 0.003 to 0.033 in thickness and the Reynolds numbers are in the laminar flow range. Although this thin channel technique has met with some success in desalination and like work where the molecular size of solutes is low and the attainable flux rates are also low, it has not heretofore been applicable to work with solutions of macromolecular materials, particularly gel-forming molecules or those molecules over about 50,000 molecular weight. This is not only because of the molecular weight of such materials, but also because the membranes which are becoming most useful in working with such materials are capable of handling far greater flux than desalination membranes even at moderate operating pressures. For example, a good desalination membrane may pass about 15 to 30 gallons per square foot per day at about 1000 to 1500 p.s.i. operating pressure; however, a microporous anisotropic ultrafiltration membrane of the type now commonly used in ultrafiltering solutions of macromolecules (e.g., the membrane available from Amicon Corporation under the trade designation XM–50) will usually be operable at far lower operating pressures to achieve far higher flux rates, for example rates of 100 gallons per square foot per day to 500 gallons per square foot per day or even higher at pressures as low as 25 or 50 p.s.i.g. The flux rate through such membranes is primarily responsive to hydraulic flow principles rather than diffusive processes of the type relied on by desalination membranes.

Consequently, it would appear to be necessary to form such very thin channels, to make any consequential impact on the high concentration of macromolecules proximate the membrane surface, that the process becomes impractical on the basis of hydrodynamic flow considerations. Even where the thin channel process might be marginally tolerable from a hydrodynamic standpoint, the work required to bring a macromolecular solution up to pressure and force it through the channel will often cause thermal or mechanical damage to the macromolecular material. In general the thin channel process as envisioned in the desalination art can be demonstrated to have little or no value under conditions where the diffusion constant of the macromolecules to be retained on the membrane surface is below about $1 \times 10^{-7}$, and especially when such molecules form gel structures on the upstream face of the membrane which gels prevent any significant back diffusion.

SUMMARY OF THE INVENTION

Therefore, it is an object of the invention to provide an improved ultrafiltration process by which macromolecular solutes or dispersants can be economically separated or concentrated from the solution being subject to ultrafiltration.

It is a further object of the invention to provide improved processes for carrying out separations and concentrations of macromolecular materials on so-called thin-channel apparatus.

Another object of the invention is to provide an improved process for the ultrafiltration of solutions comprising gel-forming solutes.

Other objects of the invention will be obvious to those skilled in the art on reading this specification.

It has now been discovered that, if certain precautions are taken, macromolecular materials may be successfully ultrafiltered under conditions of laminar flow, i.e., at a Reynolds No. below 2000. Moreover, it has been discovered that the very properties of macromolecular immobility which made the practical use of such a process seem impossible will under certain conditions, make the process possible. The precautions which must be taken are (1) the macromolecular material being subjected to ultrafiltration should comprise a gel-forming macromolecule under conditions of use and (2) flow velocity must be maintained at such a level so as to exert at least about 200 dynes/cm.$^2$ to 2000 dynes/cm.$^2$ of shear stress on this gel. This compares to a value of about 50 dynes per cm.$^2$ for desalination processes known to the art. Under these conditions, the cohesive nature of the macromolecular gel will allow the gel to be torn from the membrane surface. This tearing away of the gel layer has been found to occur with sufficient regularity so that it results in a cleaning of the ultrafilter surface which cleaning has been found to function as a reasonably good substitute for a high diffusion coefficient in clearing the membrane surface of undesirably high concentrations of macromolecules.

Moreover, it has been found that it is sometimes economically advantageous to pulse this high shear rate and/or accompany the use of high shear with a pulsating temperature pattern.

In this specification the terms "gel" and "macromolecule" require some explanation. The term "gel" is meant to cover any cohesive precipitate in the broad sense and relates more to the mechanical properties of such a precipitate than to the precise nature of intermolecular bonds which hold the precipitate together. The term "macromolecular solution" is used to describe solutions of molecules in the usual sense, but also dispersions of gel-forming inorganic material. For the purpose of this application, the size of macromolecules to which the process in this application relates are those having diffusion coefficients below about $10^{-7}$. However, since most of those working in the ultrafiltration art will most readily comprehend the terms "gel" and "macromolecule" as it relates to their own interests, these terms are adopted for use throughout this application.

The wall shear stress which is an important parameter in the process of the invention is defined by the equation $$T_w = \frac{3v\mu}{h}$$

where $T_w$ is the wall shear stress; $\mu$ is the viscosity of the solution being ultrafiltered; $h$ is the height of the channel; and $v$ is the velocity of the liquid.

Moreover, it has also been found that especially advantageous results can be achieved by certain modifications of the instantly-claimed process. For example, it has been discovered that use of heat pulsing and/or velocity pulsing tends to improve the flow rates through a membrane. In either case, the pulsing can be carried out over a very broad range with respect to both magnitude and frequency of the cycles employed. For example, the velocity pulsing can be carried out from a matter of a few seconds or over several hours and the velocity of feed liquid past the membrane surface can be increased by about 10% to about 1000%. Likewise the heat pulsing can be carried out over a matter of a few seconds or over several hours and the temperature may be increased from about 5° C. to about 100° C. Of course, each feed liquid to be ultrafiltered will have its own optimum cycle, but having read this specification those skilled in the art will be enabled to readily establish suitable conditions for their own situation.

Temperature pulses are believed to be effective to the extent that they tend to provide an effective way to disintegrate any consolidated gel layer. This effect has, for example, been demonstrated during ultrafiltration of 1% aqueous solutions of casein by bringing the feed solution to 110–120° C. for a short time and then returning it to a base-line 65° C. operating temperature. Improved fluxes last about 2 to 3 hours even though the temperature fell back to 65° C. within 30 minutes. Thus, it has been found that, even though the gel may start to reform within a fraction of a second, it does not entirely reconsolidate until a much longer period of time passes.

Velocity pulsing is not fully understood, but it is believed at least a part of its utility assignable to the fact that it allows part of the gel which is tending to consolidate on the membrane surface to be swept away before it consolidates. Thus this type of velocity-pulsing may also be looked upon as shear pulsing.

The improved flow rates through the membrane which are achieved by the instant process have been found to offer a large number of ancillary processing benefits. For example, there is less chance of degradation of feed solution during circulation through the pumping system. This is important for easily degraded solutions such as proteins and other biochemical materials.

ILLUSTRATIVE EXAMPLES OF THE INVENTION

In order to point out more fully the nature of the present invention, the following specific examples are given as an illustrative embodiment of the present process and products produced thereby.

The following examples were carried out on a thin-channel apparatus available under the trade designation TC–1 from Amicon Corpartion. This apparatus may be equipped with a number of flow-directing means which determines the path of fluid to be filtered over the membrane surface. The particular spacer selected for use had four sixteen-inch fluid channels over the membrane, each channel was 0.010 inch in height and one-quarter-inch in width. The wetted surfaces of the apparatus were coated with polytetrafluoroethylene polymer.

Pressure was measured at the inlet and outlet of the TC–1 apparatus and cell mean pressure was calculated by averaging the two values.

The ultrafiltration membrane used was that sold under the trade designation Diaflo PM–10 by Amicon Corporation unless otherwise specified. This membrane is generally characterized as an anisotropic ultrafiltration membrane having a distilled water flux of about 100–125 gallons per square foot per day at 50 p.s.i.g. and rejecting polysaccharide molecules above about 10,000 molecular weight at 50 p.s.i.g. from a 1% aqueous solution of said molecules.

Example 1

Aqueous solutions containing 1%, 5%, and 10% of bovine serum albumin having an average molecular weight of about 69,000 and 0.9% of NaCl were circulated through the above-described TC–1 ultrafiltration cell under several different pressures and recirculation rates, but in each case the concentration of albumin was maintained substantially constant by adding makeup. The following Table I indicates the flow rates, or flux in gallons per square foot of effective membrane surface area per day. In all of these runs, 100% of the albumin was retained.

TABLE I

| Pressure, p.s.i. | Trans-membrane flow rate, cc./min. | Flux through membrane [1] | | |
|---|---|---|---|---|
| | | 1.0% | 5% | 10% |
| 10 | 200 | 15.6 | 9.5 | 9.5 |
| 20 | 200 | 24.0 | 19.0 | 14.7 |
| 20 | 1,000 | 35.0 | 25.9 | 22.1 |
| 40 | 1,000 | 43.1 | 34.3 | 30.9 |

[1] Gallons per square foot per day.

Example 2

A cell was prepared whereby the height of the cell channel can be modified for carrying out experiments related to the height of the channel. This cell was 12.0 centimeters long and 4.4 centimeters wide. A 1% aqueous solution of hemoglobin having an average molecular weight of about 68,000 was prepared and ultrafiltered in the cell using an ultrafiltration membrane sold under the trade designation Diaflo XM–50 by Amicon Corporation and characterized by a retention of 90% of serum albumin having a molecular weight of 58,000. This ultrafiltration was carried out under various conditions as indicated in the following Table II.

TABLE II

| Run | Channel height, inches | Trans-membrane flux, gal./ft.$^2$/day | Pressure, ave. p.s.i. | Velocity, f.p.s. | Reynolds No. | Dynes/cm.$^2$ |
|---|---|---|---|---|---|---|
| A | 0.060 | 15.2 | 30 | 1.05 | 940 | 0.947 |
| B | 0.009 | 81.0 | 72 | 6.2 | 855 | 287 |
| C | 0.009 | 145.0 | 52.5 | 9.3 | 1,290 | 433 |
| D | 0.060 | 30.0 | 59.0 | 5.7 | 5,420 | 152 |

In all runs the operating temperature was 25° C. and the hemoglobin was entirely rejected by the membrane.

Run A demonstrates a poor flux and this rate is related to the stress value. Run D illustrates that a considerably higher stress value and more turbulence, as evidenced by a higher Reynolds number, only doubles the flux as the operating pressure doubles.

Runs B and C demonstrate that, at adequate stress values, the flux can be raised proportionately greater than the operating pressure if the turbulence is maintained at a reasonably low level as is attainable in a thin-channel operating unit.

It is of course to be understood that the foregoing examples are intended to be illustrative and that numerous changes can be made in the reactants, proportions, and conditions set forth therein without departing from the spirit of the invention as defined in the appended claims.

What is claimed is:

1. A process for ultrafiltering a solution comprising gel-forming dispersed particles or gel-forming macromolecules comprising the steps of
   (1) flowing said solution across the face of an ultrafiltration membrane under conditions of laminar flow through a thin channel not greater than 0.033 inch thick and at a velocity sufficient to exert a hydrodynamic stress on a gel formed on the membrane surface of at least 200 dynes/cm.$^2$, causing the intermittent removal of any said gel from the surface of said membrane, and conducting said removed gel away from said membrane in said solution.

2. A process as defined in claim 1 wherein the Reynolds number of the flow in said thin channel is less than about 2000.

3. A process as defined in claim 1 wherein the temperature of said solution is pulsed at the membrane surface.

4. A process as defined in claim 1 wherein the velocity of said solution across the membrane surface is pulsed.

5. A process as defined in claim 1 wherein said membrane is an anisotropic ultrafiltration membrane.

6. A process as defined in claim 1 wherein liquid flow rate through the membrane is in excess of about 100 gallons per square foot per day at a 50 p.s.i.g. operating pressure.

7. A process as defined in claim 6 wherein said macromolecules or dispersed particles have a diffusion constant of less than about $1 \times 10^{-7}$.

References Cited

UNITED STATES PATENTS

| | | | |
|---|---|---|---|
| 3,211,645 | 10/1965 | Ferrari | 210—22 |
| 3,305,097 | 2/1967 | Natelson | 210—321 |

OTHER REFERENCES

"Polyelectrolyte Complexes," by Alan S. Michaels, from Industrial and Engineering Chemistry, vol. 57, No. 10, October 1965, pp. 32–40 relied on.

REUBEN FRIEDMAN, Primary Examiner

F. A. SPEAR, JR., Assistant Examiner

U.S. Cl. X.R.

210—23.71